United States Patent
Katogi et al.

(10) Patent No.: US 10,705,510 B2
(45) Date of Patent: Jul. 7, 2020

(54) ADDITIVE MANUFACTURING SUPPORT DEVICE, ADDITIVE MANUFACTURING SUPPORT METHOD, AND COMPUTER PROGRAM PRODUCT

(71) Applicant: Mitsubishi Electric Corporation, Tokyo (JP)

(72) Inventors: Hidetaka Katogi, Tokyo (JP); Nobuyuki Sumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/343,408

(22) PCT Filed: Dec. 28, 2016

(86) PCT No.: PCT/JP2016/089107
§ 371 (c)(1),
(2) Date: Apr. 19, 2019

(87) PCT Pub. No.: WO2018/123023
PCT Pub. Date: Jul. 5, 2018

(65) Prior Publication Data
US 2019/0243339 A1 Aug. 8, 2019

(51) Int. Cl.
*G06F 17/00* (2019.01)
*G05B 19/4099* (2006.01)
(Continued)

(52) U.S. Cl.
CPC .......... *G05B 19/4099* (2013.01); *B22F 3/105* (2013.01); *B22F 3/16* (2013.01);
(Continued)

(58) Field of Classification Search
CPC ......... B33Y 10/00; B33Y 30/00; B33Y 40/00; B33Y 50/00; B22F 3/16; B22F 3/24; B23H 7/20; B23H 9/00; B23P 17/00
(Continued)

(56) References Cited

U.S. PATENT DOCUMENTS

2004/0031780 A1   2/2004   Hagemeister et al.
2004/0182201 A1   9/2004   Fuwa et al.
(Continued)

FOREIGN PATENT DOCUMENTS

DE   19533960 C2   8/1997
DE   10344902 A1   7/2004
(Continued)

OTHER PUBLICATIONS

International Search Report dated Apr. 11, 2017 for PCT/JP2016/089107 filed on Dec. 28, 2016, 7 pages including English Translation.
(Continued)

*Primary Examiner* — Md Azad
(74) *Attorney, Agent, or Firm* — Xsensus LLP

(57) ABSTRACT

An additive manufacturing support device includes reading circuitry that reads shaped article data that is data indicating the three-dimensional shape of a shaped article, first generating circuitry that generates primary data that is data indicating the three-dimensional shape of a primary separated portion provided in a region where a cutting part of a cutting apparatus passes between the plate and the shaped article, and second generating circuitry that generates, based on a machining allowance between the cutting part and an object to be cut in a process in which the cutting part passes between the plate and the shaped article, secondary data for reducing change in the machining allowance.

15 Claims, 14 Drawing Sheets

(51) Int. Cl.
*B23H 7/06* (2006.01)
*B33Y 40/00* (2020.01)
*B33Y 50/00* (2015.01)
*B23H 7/20* (2006.01)
*B22F 3/16* (2006.01)
*B23H 9/00* (2006.01)
*B22F 3/105* (2006.01)
*B33Y 30/00* (2015.01)
*B22F 3/24* (2006.01)
*B23P 17/00* (2006.01)
*B33Y 10/00* (2015.01)

(52) U.S. Cl.
CPC .............. *B22F 3/24* (2013.01); *B23H 7/065* (2013.01); *B23H 7/20* (2013.01); *B23H 9/00* (2013.01); *B23P 17/00* (2013.01); *B33Y 10/00* (2014.12); *B33Y 30/00* (2014.12); *B33Y 40/00* (2014.12); *B33Y 50/00* (2014.12); *G05B 2219/35134* (2013.01); *G05B 2219/49007* (2013.01)

(58) Field of Classification Search
USPC ......................................................... 700/119
See application file for complete search history.

(56) References Cited

U.S. PATENT DOCUMENTS

| | | |
|---|---|---|
| 2005/0029711 A1 | 2/2005 | Abe et al. |
| 2008/0241798 A1 | 10/2008 | Holzner et al. |
| 2008/0286139 A1 | 11/2008 | Abe et al. |
| 2014/0300017 A1* | 10/2014 | Wighton ............... B29C 64/141 264/40.1 |
| 2017/0014907 A1* | 1/2017 | Ng ......................... C04B 35/653 |
| 2017/0232512 A1* | 8/2017 | Joerger ................. B29C 64/153 419/53 |
| 2017/0297102 A1* | 10/2017 | Chin ....................... B28B 1/001 |
| 2018/0086004 A1* | 3/2018 | Van Espen ............. B33Y 50/02 |
| 2018/0141122 A1* | 5/2018 | Fieldman ................. B22F 3/24 |

FOREIGN PATENT DOCUMENTS

| | | |
|---|---|---|
| DE | 102004008054 B4 | 7/2006 |
| DE | 102007014985 A1 | 10/2008 |
| DE | 102014224442 A1 | 6/2016 |
| JP | 02-152724 A | 6/1990 |
| JP | 05-301293 A | 11/1993 |
| JP | 09-001675 A | 1/1997 |
| JP | 2000-037783 A | 2/2000 |
| JP | 2004-003018 A | 1/2004 |
| JP | 2007-016312 A | 1/2007 |
| JP | 2011-156569 A | 8/2011 |

OTHER PUBLICATIONS

Notification of Reasons for Refusal a Patent received for Japanese Patent Application No. 2017-553440, dated Dec. 19, 2017, 6 pages including English Translation.

Decision to Grant a Patent received for Japanese Patent Application No. 2017-553440, dated Feb. 27, 2018, 5 pages including English Translation.

Office Action issued in German Application 11 2016 007 474.3 dated Sep. 11, 2019.

* cited by examiner

FIG.11

|  | PRIMARY SEPARATED PORTION | SECONDARY SEPARATED PORTION |
|---|---|---|
| SEPARATED PORTION SHAPE | $\phi 20$ | AGGREGATE OF PILLARS OF 1 mm$^2$ |
| LATTICE WIDTH<br>LATTICE SPACE | 0.5mm<br>5mm×5mm | - |
| SEPARATED PORTION GROSS CROSS-SECTIONAL AREA | 79.7mm$^2$ | 80mm$^2$ |
| LARGEST MACHINING ALLOWANCE<br>SMALLEST MACHINING ALLOWANCE<br>LARGEST/SMALLEST<br>MEAN MACHINING ALLOWANCE | 20mm<br>2.4mm<br>8.3<br>4mm | 4mm<br>4mm<br>1.0<br>4mm |
| MACHINING ALLOWANCE STANDARD DEVIATION | 4.1 | 0.0 |

FIG.20

|  | ROTATION ANGLE 0° | ROTATION ANGLE 5° | ROTATION ANGLE 30° | ROTATION ANGLE 45° |
|---|---|---|---|---|
| SEPARATED PORTION SHAPE | ϕ20 | SAME AS ON THE LEFT | SAME AS ON THE LEFT | SAME AS ON THE LEFT |
| LATTICE WIDTH LATTICE SPACE | 0.5mm 5mm×5mm | SAME AS ON THE LEFT | SAME AS ON THE LEFT | SAME AS ON THE LEFT |
| SEPARATED PORTION GROSS CROSS-SECTIONAL AREA | 79.7mm$^2$ | SAME AS ON THE LEFT | SAME AS ON THE LEFT | SAME AS ON THE LEFT |
| LARGEST MACHINING ALLOWANCE SMALLEST MACHINING ALLOWANCE LARGEST/SMALLEST MEAN MACHINING ALLOWANCE | 20mm 2.4mm 8.3 4mm | 7.9mm 2.5mm 3.2 4mm | 6.2mm 2.6mm 2.4 4mm | 6.2mm 2.2mm 2.8 4mm |
| MACHINING ALLOWANCE STANDARD DEVIATION | 4.1 | 2.0 | 0.9 | 1.0 |

FIG.21

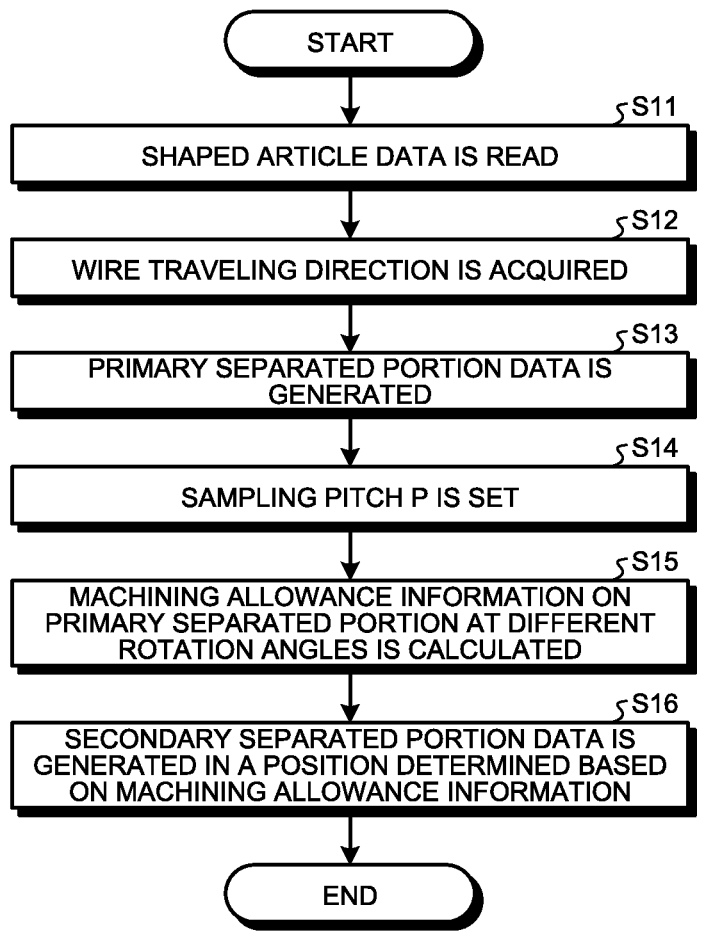

ADDITIVE MANUFACTURING SUPPORT DEVICE, ADDITIVE MANUFACTURING SUPPORT METHOD, AND COMPUTER PROGRAM PRODUCT

CROSS-REFERENCE TO RELATED APPLICATION

The present application is based on PCT filing PCT/JP2016/089107, filed Dec. 28, 2016, the entire contents of which are incorporated herein by reference.

FIELD

The present invention relates to an additive manufacturing support device, an additive manufacturing support method, and an additive manufacturing support program for supporting additive manufacturing of a shaped article on a plate.

BACKGROUND

Methods of manufacturing shaped articles include powder additive manufacturing in which a process of partially sintering or melting metal powder spread over a plate is repeated to manufacture a shaped article, as disclosed in Patent Literature 1. In the manufacturing of a shaped article using powder additive manufacturing like this, the spread metal powder and the plate are joined by sintering or melting, so that the plate and the shaped article are integrally formed. Thus, it is necessary to separate the plate and the shaped article by post-processing after forming the shaped article. To separate the plate and the shaped article, cutting is performed using a cutting apparatus exemplified by a wire electrical discharge machining apparatus. For that purpose, a separated portion that is a cutting allowance to be cut by the cutting apparatus is provided between the shaped article and the plate.

CITATION LIST

Patent Literature

Patent Literature 1: Japanese Patent Application Laid-open No. 2007-16312

SUMMARY

Technical Problem

However, the shape of the separated portion is commonly determined automatically by an additive manufacturing support device exemplified by a Computer Aided Manufacturing (CAM) device, based on shaped article data that is data indicating the three-dimensional shape of the shaped article. The automatic determination of the shape of the separated portion gives no consideration to the ease of cutting using the cutting apparatus. The determined shape may be a shape in which a machining allowance between a cutting part of the cutting apparatus and the separated portion that is an object to be cut changes greatly in a cutting process. Thus, when a wire electrical discharge machining apparatus is used as the cutting apparatus, changes in the machining allowance between a wire and the separated portion lead to unstable cutting, causing such a problem that machining speed is reduced or wire breakage is likely to occur. Note that the machining allowance is the length of a portion where the cutting part faces the object to be cut in the cutting process.

The present invention has been made in view of the above, and an object thereof is to provide an additive manufacturing support device capable of proposing additive manufacturing that facilitates cutting of a separated portion using a cutting apparatus.

Solution to Problem

To solve the above-mentioned problems and achieve the object, the present invention relates to an additive manufacturing support device for supporting additive manufacturing of a shaped article on a plate. The additive manufacturing support device includes: a reader that reads shaped article data that is data indicating a three-dimensional shape of the shaped article; a first generator that generates primary data that is data indicating a three-dimensional shape of a primary separated portion provided in a region where a cutting part of a cutting apparatus passes between the plate and the shaped article; and a second generator that generates, based on a machining allowance between the cutting part and an object to be cut in a process in which the cutting part passes between the plate and the shaped article, secondary data for reducing change in the machining allowance.

Advantageous Effects of Invention

The additive manufacturing support device according to the present invention has an advantage of being able to propose additive manufacturing that facilitates cutting of a separated portion using a cutting apparatus.

BRIEF DESCRIPTION OF DRAWINGS

FIG. 11 is a diagram illustrating machining allowance information calculated by a machining allowance information calculator in the first embodiment.

FIG. 20 is a diagram illustrating machining allowance information calculated at different rotation angles in the additive manufacturing support device according to the second embodiment.

FIG. 21 is a flowchart illustrating a procedure of generating secondary separated portion data by the additive manufacturing support device according to the second embodiment.

DESCRIPTION OF EMBODIMENTS

Hereinafter, an additive manufacturing support device, an additive manufacturing support method, and an additive manufacturing support program according to embodiments of the present invention will be described in detail with reference to the drawings. Note that the embodiments are not intended to limit this invention.

First Embodiment

Figure 1:
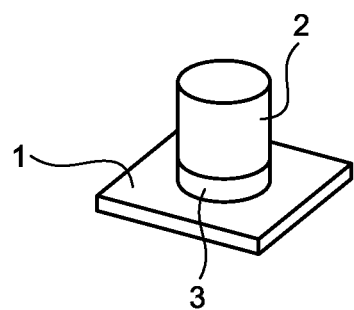
FIG. 1 is a perspective view illustrating a process of separating a shaped article additive manufactured by powder additive manufacturing from a plate.

First, the separation of a shaped article formed by powder additive manufacturing from a plate will be described. FIGS. 1 to 4 are perspective views illustrating a process of separating a shaped article additive manufactured by powder additive manufacturing from a plate. FIG. 1 illustrates a state in which a shaped article 2 is additive manufactured on a plate 1 by powder additive manufacturing in which metal powder is stacked in layers. As illustrated in FIG. 1, the shaped article 2 is integrally formed on the plate 1 via a separated portion 3.

Figure 2:
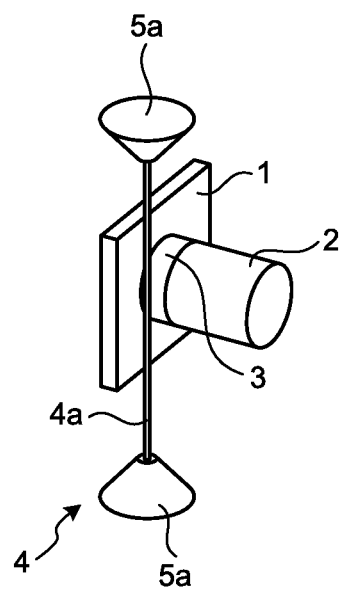
FIG. 2 is a perspective view illustrating the process of separating the shaped article additive manufactured by powder additive manufacturing from the plate.
Figure 3:
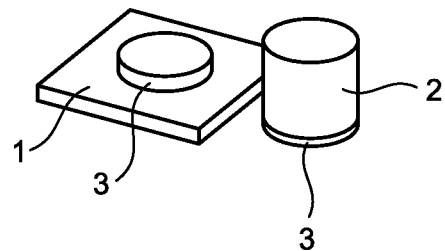
FIG. 3 is a perspective view illustrating the process of separating the shaped article additive manufactured by powder additive manufacturing from the plate.
Figure 4:
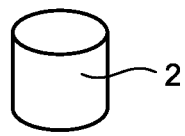
FIG. 4 is a perspective view illustrating the process of separating the shaped article additive manufactured by powder additive manufacturing from the plate.

Next, as illustrated in FIG. 2, the separated portion 3 is cut with a wire 4a as a cutting part of a wire electrical discharge machining apparatus 4 being a cutting apparatus, to separate the shaped article 2 from the plate 1 as illustrated in FIG. 3. To avoid damage to the shaped article 2, the separated portion 3 is cut with a certain amount thereof left on the shaped article 2. Then, by performing a finishing process of polishing the separated portion 3 left on the shaped article 2, the separated portion 3 is removed from the shaped article 2 as illustrated in FIG. 4. Note that the cutting apparatus is exemplified by a band saw other than the wire electrical discharge machining apparatus.

Figure 5:
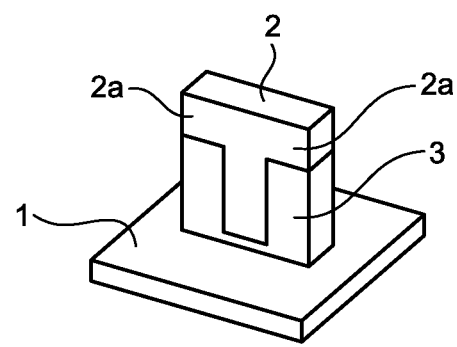
FIG. 5 is a perspective view illustrating an example of the shaped article formed on the plate by powder additive manufacturing.

The separated portion 3, which is provided between the plate 1 and the shaped article 2, has the function of supporting the shaped article in an additive manufacturing process, as well as preventing damage to the shaped article during cutting. FIG. 5 is a perspective view illustrating an example of the shaped article 2 formed on the plate 1 by powder additive manufacturing. As illustrated in FIG. 5, when the shaped article 2 has a shape with an upper portion larger than a lower portion like a T shape, the separated portion 3 supports overhanging portions 2a of the shaped article 2 from below.

Figure 6:
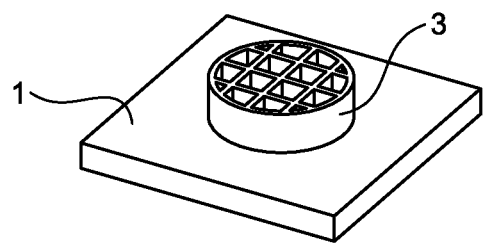
FIG. 6 is a diagram illustrating an example of a separated portion.
Figure 7:
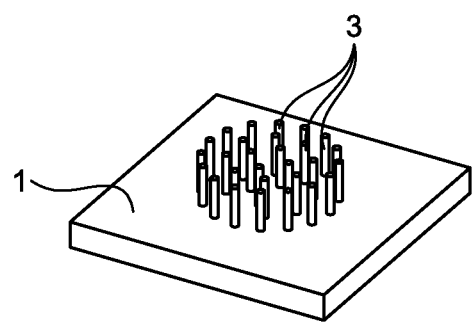
FIG. 7 is a diagram illustrating an example of the separated portion.
Figure 8:
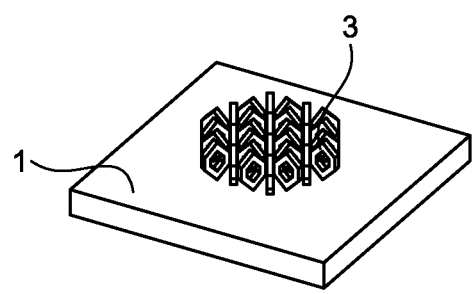
FIG. 8 is a diagram illustrating an example of the separated portion.

FIGS. 6 to 8 are diagrams illustrating an example of the separated portion 3. Even when the separated portion 3 is provided for the purpose of avoiding damage to the shaped article 2, and when the separated portion 3 is provided for the purpose of supporting the shaped article 2, the separated portion 3 is an unnecessary portion for the shaped article 2 itself. Therefore, the separated portion 3 is formed in a shape with consideration given to the ease of removal in the finishing process. Of the spread metal powder, metal powder left in a powder state without becoming the separated portion 3 may be reusable for additive manufacturing. Therefore, the separated portion 3 is formed to have a minimum volume to leave more metal powder in a powder state.

Examples of the shape of the separated portion 3 with consideration given to the ease of removal in the finishing process and the smallness of the volume include a lattice shape illustrated in FIG. 6, a columnar shape illustrated in FIG. 7, and a complicated geometric shape illustrated in FIG. 8. Such a shape of the separated portion 3 is commonly generated automatically by an additive manufacturing support device exemplified by a CAM device, based on shaped article data that is data indicating the three-dimensional shape of the shaped article 2 generated by Computer Aided Design (CAD).

Figure 9:
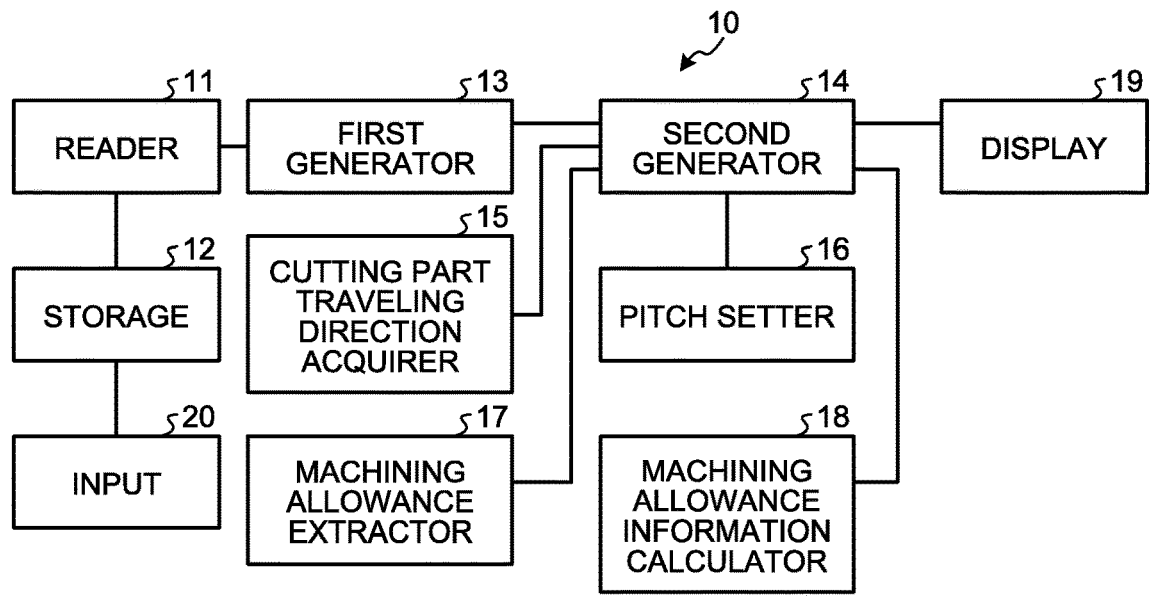
FIG. 9 is a block diagram illustrating the functional configuration of an additive manufacturing support device according to a first embodiment of the present invention.

Next, an additive manufacturing support device according to the first embodiment of the present invention will be described. FIG. 9 is a block diagram illustrating the functional configuration of the additive manufacturing support device according to the first embodiment of the present invention. An additive manufacturing support device 10 generates separated portion data indicating the three-dimensional shape of the separated portion 3, based on shaped article data on the shaped article 2.

As illustrated in FIG. 9, the additive manufacturing support device 10 includes a reader 11 that reads in shaped article data. Shaped article data is data generated by the user, and may be stored in advance in a storage 12 described later, or may be stored in an external storage device connected to the additive manufacturing support device 10 by the user, or may be stored in a storage device provided in an external device connected to the additive manufacturing support device 10.

The additive manufacturing support device 10 includes a first generator 13 that generates separated portion data indicating the three-dimensional shape of the separated portion 3, based on the three-dimensional shape indicated by the shaped article data. A second generator 14 described later also generates separated portion data. To distinguish them, separated portion data generated by the first generator 13 is referred to as primary separated portion data, which is primary data, and a three-dimensional shape indicated by the primary separated portion data is referred to as a primary separated portion 31, which is an object to be cut, for explanation. Separated portion data generated by the second generator 14 is referred to as secondary separated portion data, which is secondary data, and a three-dimensional shape indicated by the secondary separated portion data is referred to as a secondary separated portion 32, which is an object to be cut, for explanation.

The first generator 13 generates primary separated portion data in a predetermined pattern shape. Data indicating the predetermined pattern shape is stored in the storage 12 described later. Examples of the predetermined pattern shape include the lattice shape, the columnar shape, and the complicated geometric shape illustrated in FIGS. 6 to 8. Here, a case where the lattice shape illustrated in FIG. 6 is the predetermined pattern shape will be described as an example.

The additive manufacturing support device 10 includes a cutting part traveling direction acquirer 15 that acquires information indicating the traveling direction of the wire 4a when cutting the separated portion 3 as illustrated in FIG. 2. The traveling direction of the wire 4a is determined by the posture in which the plate 1 is held in the wire electrical discharge machining apparatus 4, for example. The posture in which the plate 1 is held in the wire electrical discharge machining apparatus 4 is determined by the shape of the plate 1. When the plate 1 is a rectangular parallelepiped of a plate shape and is held as illustrated in FIG. 2, a direction parallel to one side of the surface of the plate 1 on which the shaped article 2 is formed is the traveling direction of the wire 4a.

Figure 10:
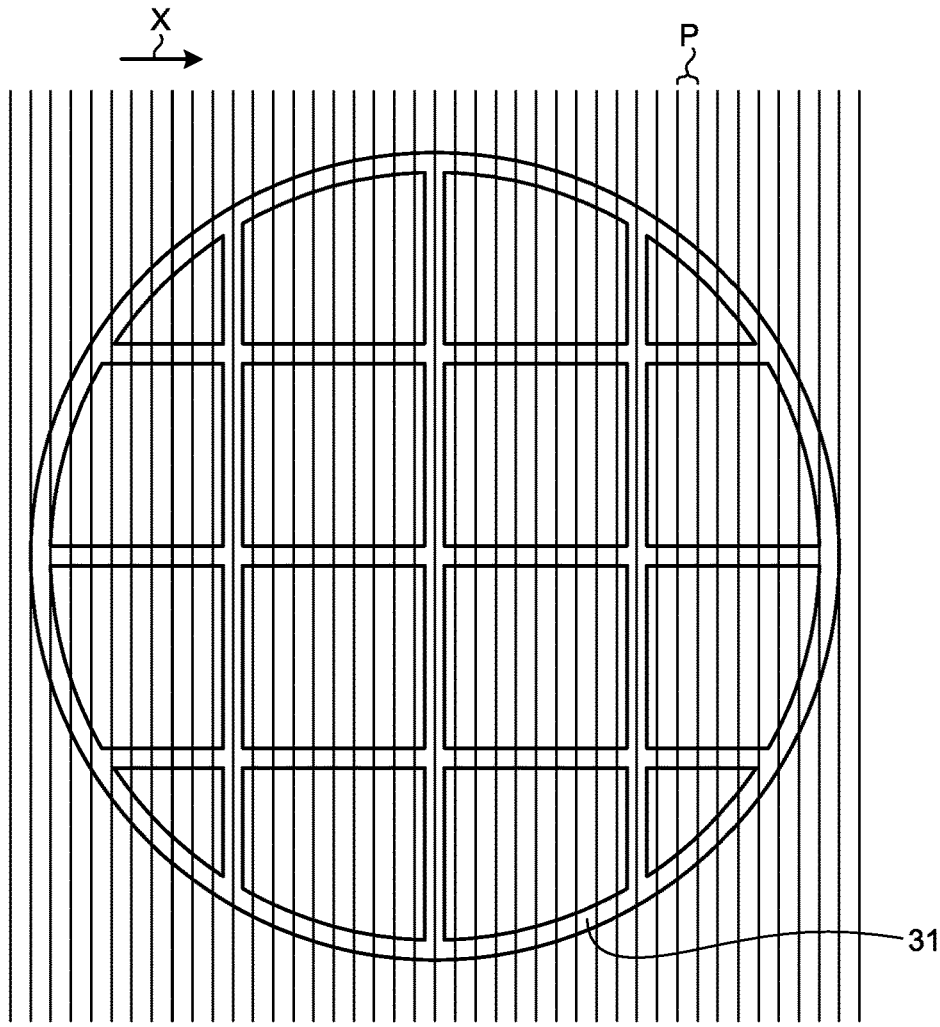
FIG. 10 is a diagram illustrating a state in which a sampling pitch is set for a primary separated portion in the first embodiment.

The additive manufacturing support device 10 includes a pitch setter 16 that sets a sampling pitch p in the process of cutting the primary separated portion as the object to be cut with the wire 4a. FIG. 10 is a diagram illustrating a state in which the sampling pitch p is set for the primary separated portion in the first embodiment. When the primary separated portion 31 has a lattice shape, the sampling pitch p is preferably smaller than the lattice width, and more preferably equal to or smaller than the diameter of the wire 4a. If the sampling pitch p is too large, errors in machining allowance information described later become large, and if the sampling pitch p is too small, calculation time of machining allowance information becomes long. When the diameter of the wire 4a and the lattice width are unknown, the height of a layer formed by spreading and sintering metal powder at one time in additive manufacturing, a so-called lamination pitch may be set as the sampling pitch p. The traveling direction of the wire 4a is indicated by an arrow X.

The additive manufacturing support device 10 includes a machining allowance extractor 17 that extracts a machining allowance at intervals of the sampling pitch p. The pitch setter 16 calculates a provisional cross-sectional area of a cut surface of the primary separated portion, based on the product of the sum total of machining allowances extracted at intervals of the sampling pitch p and the sampling pitch p. Here, the machining allowance is the sum of the lengths of portions of the wire 4a cutting the separated portion 3 when the wire 4a performs cutting.

Further, the pitch setter 16 calculates the actual cross-sectional area of the cut surface of the primary separated portion, based on the primary separated portion data. When the difference between the provisional cross-sectional area of the cut surface of the primary separated portion and the actual cross-sectional area of the cut surface of the primary separated portion falls out of a predetermined tolerance, the pitch setter 16 sets the sampling pitch p to a smaller value.

The additive manufacturing support device 10 includes a machining allowance information calculator 18 that calculates, based on the machining allowance extracted at intervals of the sampling pitch p, machining allowance information that is information on the machining allowance. FIG. 11 is a diagram illustrating the machining allowance information calculated by the machining allowance information calculator 18 in the first embodiment.

As illustrated in FIG. 11, the machining allowance information includes the largest machining allowance that is the largest of the machining allowances extracted at intervals of the sampling pitch p and the smallest machining allowance that is the smallest. The machining allowance information also includes the ratio between the largest machining allowance and the smallest machining allowance, and a mean machining allowance that is the mean of the machining allowances extracted at intervals of the sampling pitch p. The machining allowance information also includes a machining allowance standard deviation that is the standard deviation of the machining allowances extracted at intervals of the sampling pitch p. Thus, the machining allowance information calculator 18 provides the function of a deviation calculator that calculates the machining allowance standard deviation. In some cases, in a state where the wire 4a is in contact with the primary separated portion 31, the machining allowance becomes zero, and the machining allowance information cannot be appropriately calculated. Therefore, data equal to or lower than a certain threshold among the extracted machining allowances may be excluded to calculate the machining allowance information.

The additive manufacturing support device 10 includes the second generator 14 that generates secondary separated portion data that is data indicating the three-dimensional shape of a secondary separated portion. The second generator 14 determines the shape of a secondary separated portion based on the machining allowance information calculated by the machining allowance information calculator 18, and generates secondary separated portion data. In the first embodiment, the shape of the secondary separated portion is determined such that the machining allowance standard deviation becomes smaller.

Figure 12:
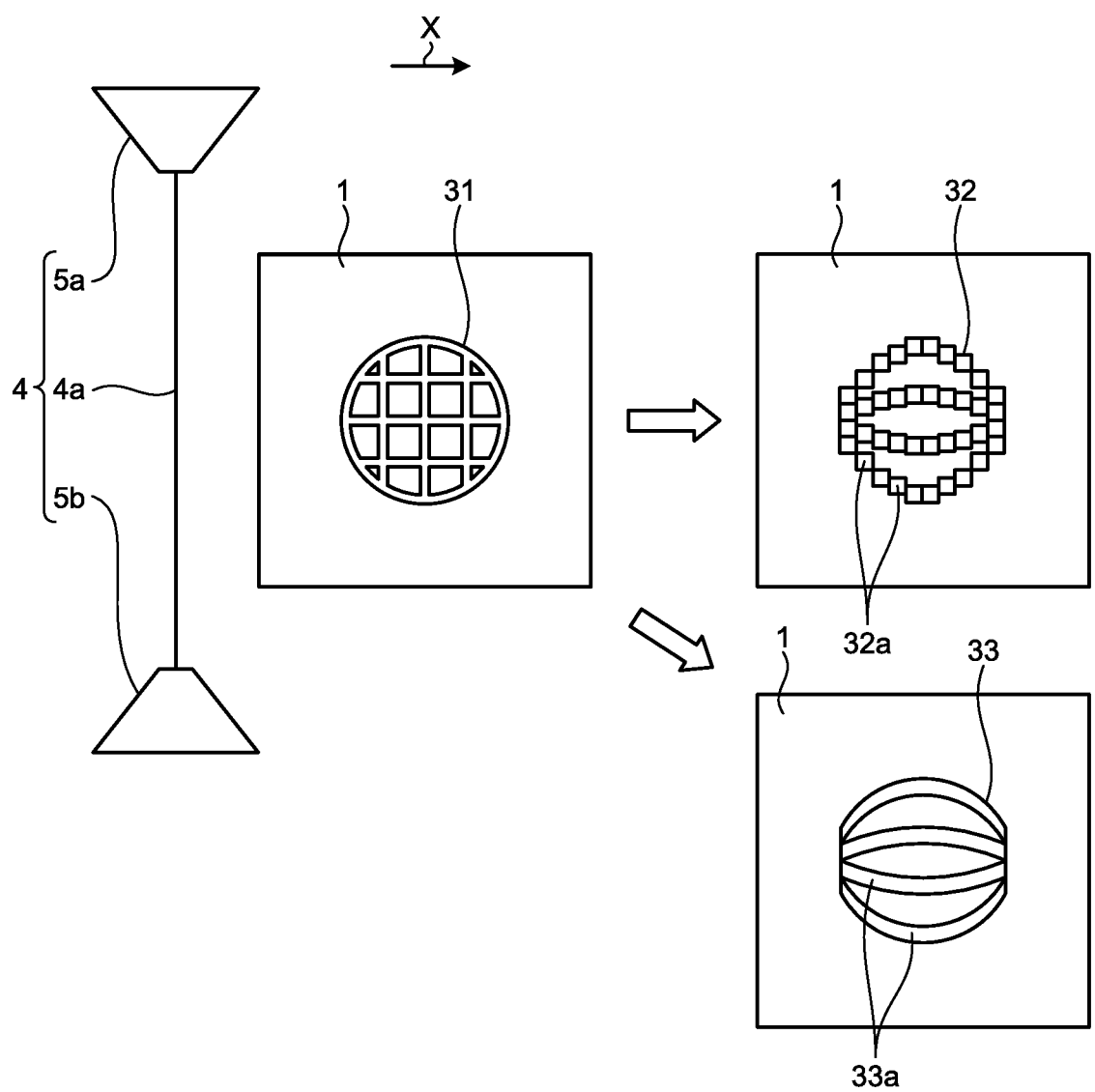
FIG. 12 is a diagram for comparing the shape of the primary separated portion and the shape of a secondary separated portion in the first embodiment.

FIG. 12 is a diagram for comparing the shape of the primary separated portion and the shape of the secondary separated portion in the first embodiment. The second generator 14 determines the shape of a secondary separated portion 32 so that the machining allowance in the cutting process of the secondary separated portion 32 becomes constant at the mean machining allowance of the primary separated portion 31. As illustrated in FIG. 12, the primary separated portion 31 has the lattice shape, while the secondary separated portion 32 has a shape in which a plurality of pillar-shaped portions 32a having a quadrangular cross-sectional shape are arranged. As illustrated in FIG. 11, the mean machining allowance of the primary separated portion 31 is 4 mm. If the pillar-shaped portions 32a have a pillar shape measuring 1 mm per side, by arranging four pillar-shaped portions 32a in the extending direction of the wire 4a, the machining allowance of the secondary separated portion 32 can be 4 mm, which is equal to the mean machining allowance of the primary separated portion 31. With pillar-shaped portions 32a aligned in the extending direction of the wire 4a as one unit, by aligning a plurality of units without spacing in the traveling direction of the wire 4a, the machining allowance in the cutting process of the secondary separated portion 32 can be made constant at 4 mm. Furthermore, by spacing pillar-shaped portions 32a in the extending direction of the wire 4a in a unit in accordance with the shape of the shaped article 2, the secondary separated portion data indicating the shape of the secondary separated portion 32 illustrated in FIG. 12 can be generated. FIG. 12 also illustrates a secondary separated portion 33 in which walls 33a of a constant width are arranged in the extending direction of the wire 4a.

FIG. 11 also illustrates machining allowance information on the secondary separated portion 32. As illustrated in FIG. 11, since the secondary separated portion 32 has the constant machining allowance in the cutting process, the machining allowance standard deviation is zero. On the other hand, the primary separated portion 31 has a machining allowance standard deviation of 4.1, and the machining allowance changes greatly in the process of cutting the primary separated portion 31.

The additive manufacturing support device 10 includes a display 19 for displaying information, an input 20 to be operated by a user to enter information, and a storage 12 for storing information. On the display 19, various types of information including the machining allowance information on the secondary separated portion 32 illustrated in FIG. 11 are displayed. The input 20 allows various types of information to be entered by the user operating it. The traveling direction of the wire 4a may be entered by the user operating the input 20. In the storage 12, various types of information including the above-described tolerance and the pattern shape of the primary separated portion 31 are stored.

Figure 13:
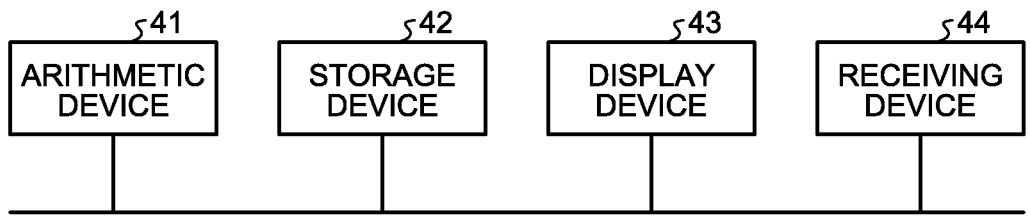
FIG. 13 is a diagram illustrating the hardware configuration of the additive manufacturing support device according to the first embodiment.

FIG. 13 is a diagram illustrating the hardware configuration of the additive manufacturing support device 10 according to the first embodiment. The additive manufacturing support device 10 includes an arithmetic device 41, a storage device 42, a display device 43, and a receiving device 44. The arithmetic device 41 is exemplified by a Central Processing Unit (CPU). The above-described functions of the reader 11, the first generator 13, the second generator 14, the cutting part traveling direction acquirer 15, the pitch setter 16, the machining allowance extractor 17, and the machining allowance information calculator 18 are implemented by the arithmetic device 41. The storage device 42 is exemplified by semiconductor memory, a magnetic disk, or an optical disk. The above-described function of the storage 12 is implemented by the storage device 42. In the storage device 42, programs that cause the arithmetic device 41 to provide the above functions are stored. The storage device 42 is also used as a primary storage area when the arithmetic device 41 executes the programs. The programs are exemplified by software, firmware, or a combination of software and firmware. The display device 43 is exemplified by a liquid crystal display. The above-described function of the display 19 is implemented by the display device 43. The receiving device 44 is exemplified by a keyboard and a touch panel. The above-described function of the input 20 is implemented by the receiving device 44.

Figure 14:
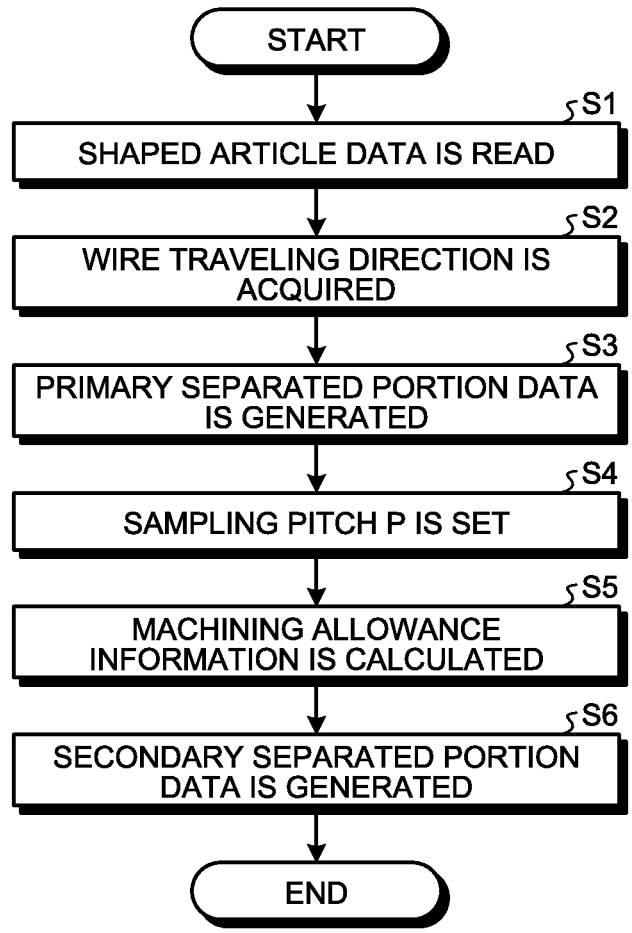
FIG. 14 is a flowchart illustrating a procedure of generating secondary separated portion data by the additive manufacturing support device according to the first embodiment.

A description will be given of a procedure of generating secondary separated portion data by the additive manufacturing support device 10 described above. FIG. 14 is a flowchart illustrating a procedure of generating secondary separated portion data by the additive manufacturing support device 10 according to the first embodiment.

First, shaped article data is read (step S1), and the traveling direction of the wire 4a is acquired (step S2). Next, primary separated portion data is generated (step S3), and the sampling pitch p is set (step S4). Next, machining allowance information is calculated (step S5), and secondary separated portion data is generated (step S6).

Here, one criterion in setting machining conditions in the wire electrical discharge machining apparatus 4 is the size of the machining allowance. Thus, when the machining allowance changes in the cutting process, machining condition setting may be difficult. For example, even when machining conditions suitable for a certain machining allowance are set, cutting with a machining allowance different from the machining allowance suitable for the current machining conditions occurs in the cutting process. Consequently, the cutting becomes unstable, and the machining speed is reduced or the breakage of the wire 4a is likely to occur.

In the first embodiment, as illustrated in FIG. 11, the machining allowance standard deviation of the secondary separated portion 32 is smaller than that of the primary separated portion 31. That is, when the secondary separated portion 32 is cut, changes in the machining allowance are smaller, and machining condition setting in the wire electrical discharge machining apparatus 4 is easier than when the primary separated portion 31 is cut. Thus, the generation of the secondary separated portion data in the above procedure facilitates machining condition setting in the wire electrical discharge machining apparatus 4. In addition, due to small changes in the machining allowance, the cutting can be stabilized and the machining speed can be maintained. That is, the secondary separated portion data, which is the secondary data, is data for reducing changes in the machining allowance.

Note that the machining allowance standard deviation of the secondary separated portion 32 does not necessarily need to be zero. If it is smaller than the machining allowance standard deviation of the primary separated portion 31, machining condition setting can be facilitated. For example, when the spacing between the pillar-shaped portions 32a is equal to or larger than a reference value, or when the pillar-shaped portions 32a even in close contact with each other partly stick out of the shaped article 2, a pillar-shaped portion 32a may be added or deleted. Even in this case, if the standard deviation of the secondary separated portion 32 is smaller than the standard deviation of the primary separated portion 31, the cutting is stabilized and the machining speed is maintained.

Further, the display of the machining allowance information illustrated in FIG. 10 on the display device 43 allows the user to view the cross-sectional area of the cut surface and changes in the machining allowance, which cannot be determined from the appearance of the separated portion 3. This allows the user to have more information necessary for setting the machining conditions. Consequently, by having a lot of information, the user can easily set the machining conditions.

Figure 15:
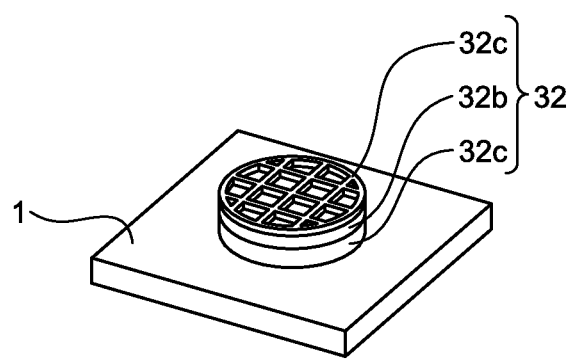
FIG. 15 is a diagram illustrating a modification of the secondary separated portion generated by the additive manufacturing support device according to the first embodiment.
Figure 16:
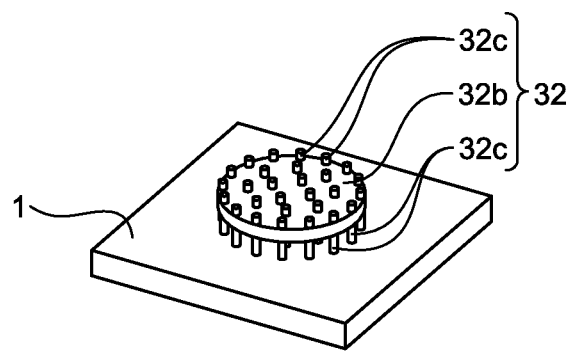
FIG. 16 is a diagram illustrating a modification of the secondary separated portion generated by the additive manufacturing support device according to the first embodiment.
Figure 17:
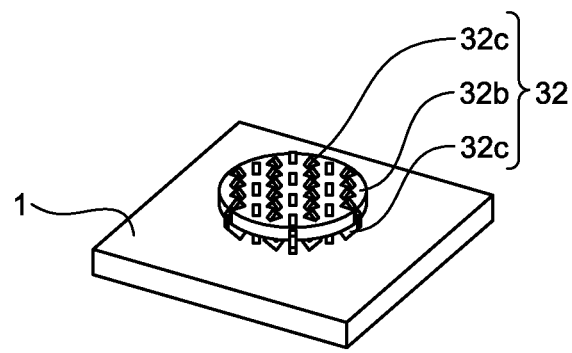
FIG. 17 is a diagram illustrating a modification of the secondary separated portion generated by the additive manufacturing support device according to the first embodiment.

FIGS. 15 to 17 are diagrams illustrating modifications of the secondary separated portion 32 generated in the additive manufacturing support device 10 according to the first embodiment. In FIGS. 15 to 17, a solid portion 32b that is solid is provided in the path of the wire 4a. In the examples illustrated in FIGS. 15 to 17, between the solid portion 32b and the plate 1 and between the solid portion 32b and the shaped article 2 are gap portions 32c having space in a lattice shape, a columnar shape, and a geometric shape.

The provision of the solid portion 32b can eliminate residual gas or air and residual metal powder in a portion of the secondary separated portion 32 actually cut by the wire 4a. The wire 4a cuts the secondary separated portion 32 utilizing a discharge phenomenon. If gas or air is present in a discharge portion, the wire 4a is likely to break due to vaporization explosion. If metal powder is left, the metal powder intervenes between the wire 4a and the secondary separated portion 32, and tends to cause a short circuit. When the wire 4a is short-circuited, it locally generates high heat and tends to break. Therefore, the provision of the solid portion 32b can prevent the occurrence of breakage of the wire 4a. The thickness of the solid portion 32b is desirably equal to or larger than the diameter of the wire 4a.

When the shape of the solid portion 32b is the shape of a rectangular parallelepiped having one side parallel to the traveling direction of the wire 4a, the machining allowance standard deviation can be set to zero to facilitate machining condition setting, stabilize cutting, and maintain manufacturing speed.

Second Embodiment

Figure 18:
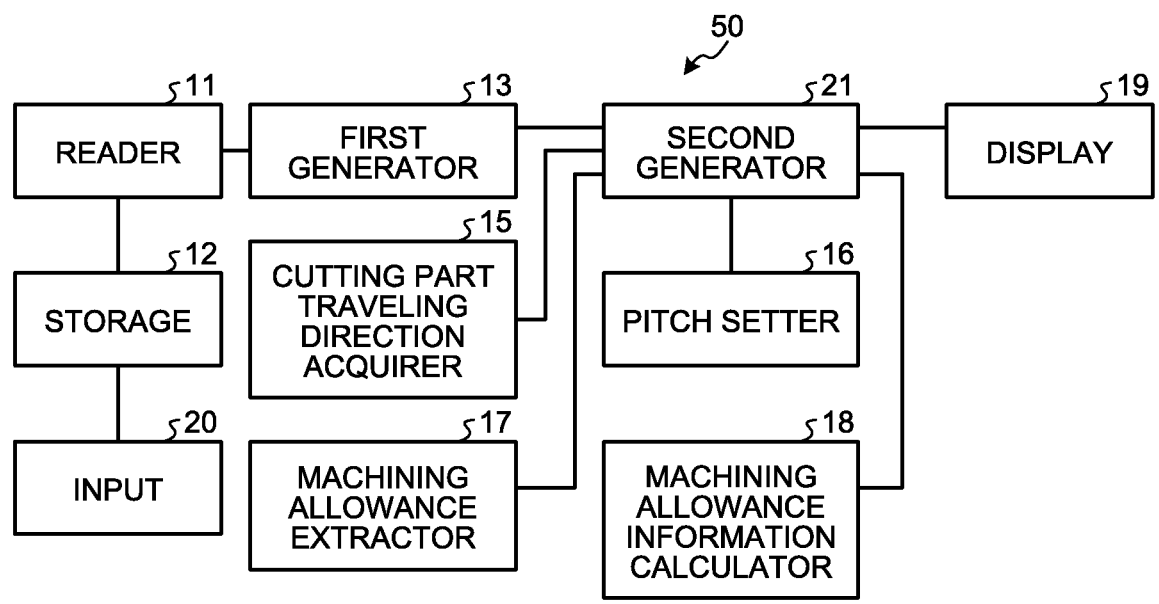
FIG. 18 is a block diagram illustrating the functional configuration of an additive manufacturing support device according to a second embodiment of the present invention.

FIG. 18 is a block diagram illustrating the functional configuration of an additive manufacturing support device according to a second embodiment of the present invention. The same reference numerals are assigned to the same components as those in the first embodiment without detailed explanations. An additive manufacturing support device 50 according to the second embodiment uses the primary separated portion 31 changed in the relative posture with respect to the plate 1 or the shaped article 2 as the secondary separated portion 32 as an object to be cut. Data indicating the three-dimensional shape of the secondary separated portion 32 is used as secondary data.

In the additive manufacturing support device 50, the second generator 21 illustrated in FIG. 18 causes the machining allowance extractor 17 and the machining allowance information calculator 18 to extract a machining allowance and calculate machining allowance information at each of a plurality of angles through which the primary separated portion 31 is rotated in a cut plane with respect to the traveling direction of the wire 4a.

Figure 19:
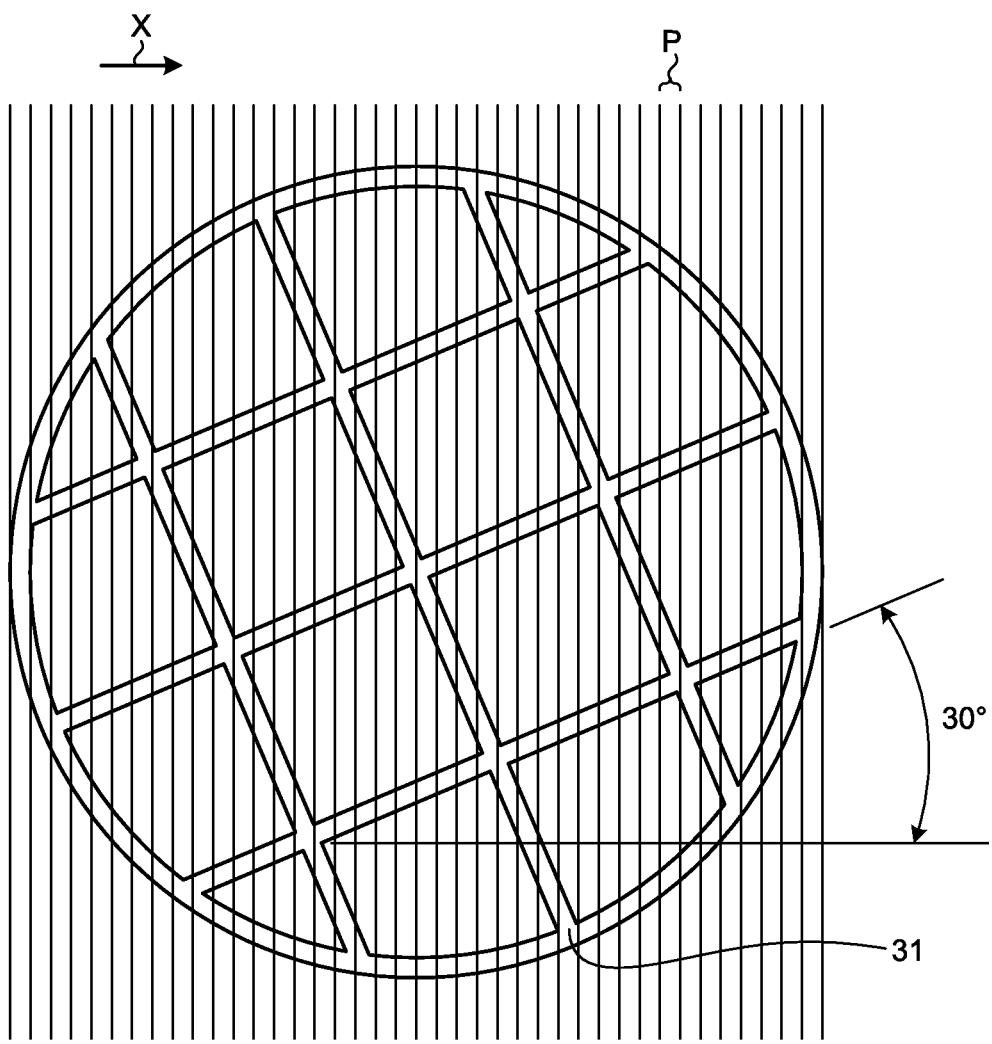
FIG. 19 is a diagram illustrating a state in which the sampling pitch is set for the primary separated portion rotated with respect to the traveling direction of a wire.

FIG. 19 is a diagram illustrating a state in which the sampling pitch p is set for the primary separated portion 31 rotated with respect to the traveling direction of the wire 4a. When the state illustrated in FIG. 10 is a state in which the primary separated portion 31 has been rotated 0° with respect to the traveling direction of the wire 4a, the state illustrated in FIG. 19 is a state in which the primary separated portion 31 has been rotated 30° with respect to the traveling direction of the wire 4a.

FIG. 20 is a diagram illustrating machining allowance information calculated at different rotation angles in the additive manufacturing support device according to the second embodiment. In the example illustrated in FIG. 20, when the rotation angle of the primary separated portion 31 is set to 30°, the machining allowance standard deviation is the smallest, and the ratio between the largest machining allowance and the smallest machining allowance is also the smallest. Thus, a posture in which cutting is performed in the state illustrated in FIG. 19 is set as the secondary separated portion 32, and secondary separated portion data indicating the three-dimensional shape of the secondary separated portion 32 is generated by the second generator 21 as the secondary data. Extraction of a machining allowance and calculation of machining allowance information are performed at rotation angles ranging at least from 0 to 45°, desirably ranging from 0° to 360°. The extracted machining allowance and the machining allowance information are stored in the storage 2. Criteria for determining the rotation angle of the secondary separated portion 32 are not limited to the smallness of the machining allowance standard deviation and the ratio between the largest machining allowance and the smallest machining allowance.

Next, a description will be given of a procedure of generating secondary separated portion data by the additive manufacturing support device 50. FIG. 21 is a flowchart illustrating a procedure of generating secondary separated portion data by the additive manufacturing support device 50 according to the second embodiment. First, shaped article data is read in (step S11), and the traveling direction of the wire 4a is acquired (step S12). Next, primary separated portion data is generated (step S13), and the sampling pitch p is set (step S14). Next, machining allowance information on the primary separated portion 31 at different rotation angles is calculated (step S15), and secondary separated portion data is generated in a posture determined based on the machining allowance information (step S16).

The hardware configuration of the additive manufacturing support device 50 is the same as that in the first embodiment, and the function of the second generator 21 is implemented by the arithmetic device 41 illustrated in FIG. 13.

In the second embodiment, the secondary separated portion 32 can be cut in a posture in which the standard deviation is smaller. Thus, changes in the machining allowance are small, facilitating machining condition setting in the wire electrical discharge machining apparatus 4. Accordingly, the posture of the primary separated portion data is determined in the above procedure, which facilitates machining condition setting in the wire electrical discharge machining apparatus 4. In addition, due to small changes in the machining allowance, the cutting can be stabilized and the machining speed can be maintained. Also in the second embodiment, data indicating the three-dimensional shape of the secondary separated portion 32, which is the secondary data, is data for reducing changes in the machining allowance.

Third Embodiment

Figure 22:
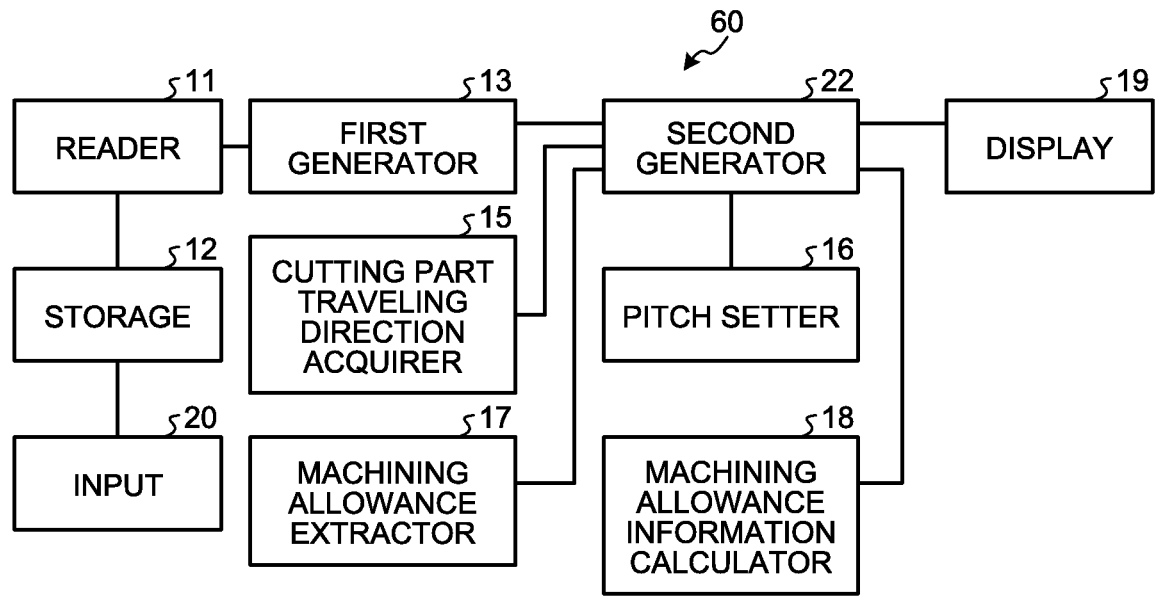
FIG. 22 is a block diagram illustrating the functional configuration of an additive manufacturing support device according to a third embodiment.

FIG. 22 is a block diagram illustrating the functional configuration of an additive manufacturing support device 60 according to a third embodiment. The same reference numerals are assigned to the same components as those in the first and second embodiments without detailed explanations. In the third embodiment, the second generator 22 causes the extraction of a machining allowance at each rotation angle and the calculation of the machining allowance as in the second embodiment, but does not generate secondary separated portion data with the posture of the primary separated portion 31 left at 0°. Instead, the second generator 22 sets data for displaying information indicating a desirable angle of the wire 4a of the wire electrical discharge machining apparatus 4, that is, at least one angle selected from a plurality of rotation angles, based on machining allowance information, on at least one of the plate 1 and the separated portion 3, as secondary data. Some wire electrical discharge machining apparatus 4 can change the inclination of the wire 4a by relatively moving wire guides 5a and 5b supporting the wire 4a. When cutting is performed using the wire electrical discharge machining apparatus 4 like this, by changing the angle of the wire 4a without changing the posture of the primary separated portion 31, the cutting can be stabilized and the manufacturing speed can be maintained. Also in the third embodiment, the data to be displayed on at least one of the plate 1 and the separated portion 3 being the secondary data is data for reducing changes in the machining allowance.

Figure 23:
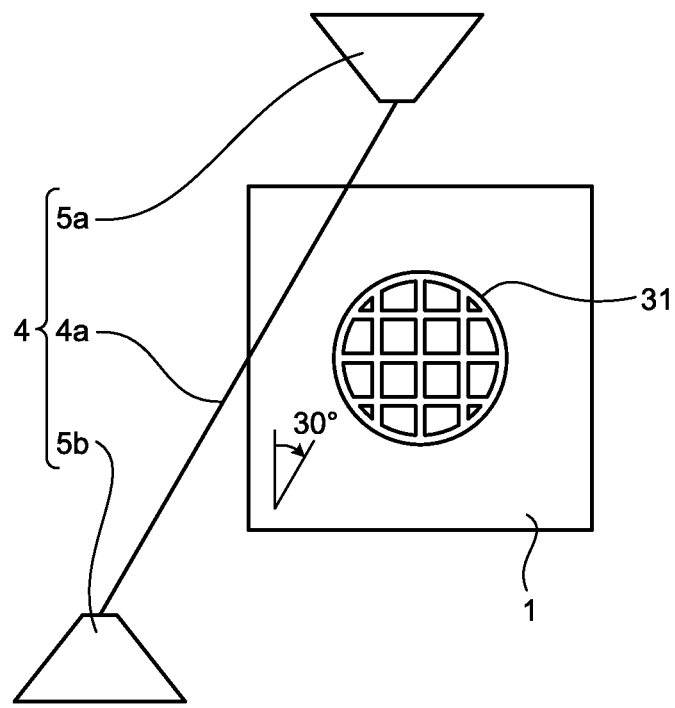
FIG. 23 is a diagram illustrating the plate on which information indicating a desirable angle of the wire is displayed and the primary separated portion in the third embodiment.

FIG. 23 is a diagram illustrating: the plate 1 on which information indicating a desirable angle of the wire 4a is displayed; and the primary separated portion 31, in the third embodiment. As illustrated in FIG. 23, information indicating a desirable angle of the wire 4a is displayed on the plate 1 with character information such as "30°".

Note that information indicating a desirable angle of the wire 4a is not limited to character information, and may be code information that can be read by a reader. The code information is exemplified by a bar code and a QR code (registered trademark). The wire electrical discharge machining apparatus 4 may be provided with a reader to cause it to read code information so that the wire guides 5a and 5b automatically move to set the wire 4a at a suitable angle. Information indicating a desirable angle of the wire 4a may be displayed on the display 19.

The hardware configuration of the additive manufacturing support device 60 is the same as that in the first embodiment, and the function of the second generator 22 is implemented by the arithmetic device 41 illustrated in FIG. 13.

Figure 24:
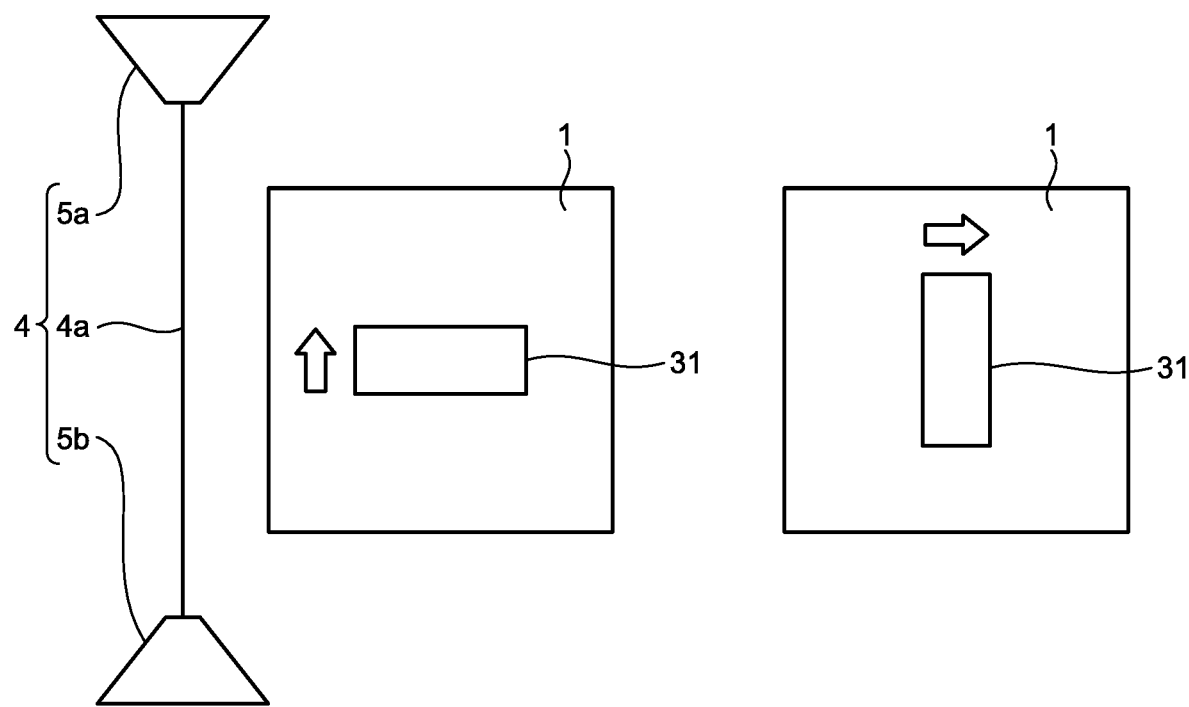
FIG. 24 is a diagram illustrating the plate on which information indicating a desirable traveling direction of the wire is displayed and the primary separated portion in the third embodiment.

FIG. 24 is a diagram illustrating the plate 1 on which information indicating a desirable traveling direction of the wire 4a is displayed and the primary separated portion 31 in the third embodiment. As illustrated in FIG. 24, the second generator 22 causes the plate 1 or the primary separated portion 31 to display a traveling direction of the wire 4a to bring the mean machining allowance of the machining allowance information close to a predetermined suitable machining allowance. In the third embodiment, a desirable traveling direction of the wire 4a is displayed with an arrow as symbol information on the plate 1. Note that information indicating a desirable traveling direction of the wire 4a may be character information or code information. The predetermined suitable machining allowance may be stored in the storage 12, or may be entered by the user through the input 20.

In cutting by the wire electrical discharge machining apparatus 4, a machining allowance suitable for the cutting may be determined by conditions including the diameter of the wire 4a. In general, a suitable machining allowance is 30 mm to 50 mm. As illustrated in FIG. 24, when the long side of the primary separated portion 31 of a rectangular shape is 50 mm and the short side is 15 mm, an arrow is displayed such that a direction parallel to the short side is the traveling direction of the wire 4a. Thus, by performing cutting, in an actual cutting process, with a machining allowance closer to a suitable machining allowance, stabilized cutting and improved manufacturing speed can be achieved.

The above-described additive manufacturing support device 10, 50, or 60 may be implemented by a computer that creates shaped article data, or may be implemented by an additive manufacturing apparatus that receives input of shaped article data and performs additive manufacturing. Alternatively, it may be implemented by a server connected via a network to a computer that creates shaped article data or an additive manufacturing apparatus that performs additive manufacturing. Alternatively, it may be provided as programs that cause an arithmetic device to provide the above-described various functions, or a recording medium in which the programs are recorded.

The configuration described in the above embodiments illustrates an example of the subject matter of the present invention, and can be combined with another known art, and can be partly omitted or changed without departing from the scope of the present invention.

REFERENCE SIGNS LIST 1 plate; 2 shaped article; 2a overhanging portion; 3 separated portion; 4 wire electrical discharge machining apparatus; 4a wire; 5a, 5b wire guide; 10, 50, additive manufacturing support device; 11 reader; 12 storage; 13 first generator; 14, 21, 22 second generator; 15 cutting part traveling direction acquirer; 16 pitch setter; 17 machining allowance extractor; 18 machining allowance information calculator; 19 display; 20 input; 31 primary separated portion; 32 secondary separated portion; 32a pillar-shaped portion; 32b solid portion; 32c gap portion; 41 arithmetic device; 42 storage device; 43 display device; 44 receiving device.

The invention claimed is:

1. An additive manufacturing support device for supporting additive manufacturing of a shaped article on a plate, the additive manufacturing support device comprising processing circuitry to implement:
    a reader to read shaped article data that is data indicating a three-dimensional shape of the shaped article;
    a first generator to generate primary data that is data indicating a three-dimensional shape of a primary separated portion provided in a region where a cutting part of a cutting apparatus passes between the plate and the shaped article;
    a second generator to generate, based on a machining allowance that is a length along which an object to be cut and the cutting part intersect in a process in which the cutting part passes between the plate and the shaped article, secondary data in which change in the machining allowance is reduced compared to the primary data;
    a pitch setter to set a sampling pitch in a process in which the cutting part cuts the primary separated portion as the object to be cut;
    a machining allowance extractor to extract the machining allowance at intervals of the sampling pitch; and
    a deviation calculator to calculate a standard deviation of the extracted machining allowance,
    wherein the second generator causes the extraction of the machining allowance and the calculation of the standard deviation to be performed at each of a plurality of rotation angles through which the primary separated portion is rotated in a cut plane of the primary separated portion, determines a traveling direction of the cutting part, based on the calculated standard deviation, and sets data for displaying information indicating the traveling direction on at least one of the plate and the primary separated portion, as the secondary data.

2. The additive manufacturing support device according to claim 1, further comprising:
    cutting part traveling direction acquisition circuitry to acquire information indicating a traveling direction of the cutting part with respect to the primary separated portion,
    wherein the secondary data is data indicating a three-dimensional shape of a secondary separated portion that is different in shape from the primary separated portion and is provided between the plate and the shaped article in place of the primary separated portion, and
    a standard deviation of the machining allowance when the secondary separated portion is the object to be cut by the cutting part traveling along the traveling direction is smaller than the standard deviation when the primary separated portion is the object to be cut by the cutting part traveling along the traveling direction.

3. The additive manufacturing support device according to claim 2, wherein the secondary separated portion comprises a plurality of pillar-shaped portions of a pillar shape arranged in the traveling direction without spacing.

4. The additive manufacturing support device according to claim 1, further comprising:
 a pitch setting circuitry to set a sampling pitch in a process in which the cutting part cuts the primary separated portion as the object to be cut;
 machining allowance extracting circuitry to extract the machining allowance at intervals of the sampling pitch; and
 a deviation calculating circuitry to calculate a standard deviation of the extracted machining allowance,
 wherein the second generating circuitry causes the extraction of the machining allowance and the calculation of the standard deviation to be performed at each of a plurality of angles through which the primary separated portion is rotated in a cut plane of the primary separated portion, and sets data indicating a three-dimensional shape of a secondary separated portion obtained by changing a posture of the primary separated portion based on the calculated standard deviation as the secondary data.

5. The additive manufacturing support device according to claim 1, wherein
 the primary separated portion is formed in a shape having space in a path of the cutting part,
 the secondary data is data indicating a three-dimensional shape of a secondary separated portion obtained by changing the shape of the primary separated portion, and
 the secondary separated portion includes a solid portion of a solid shape provided in the path of the cutting part, and a gap portion having space provided between the solid portion and the plate.

6. The additive manufacturing support device according to claim 1, further comprising:
 a pitch setting circuitry to set a sampling pitch in a process in which the cutting part cuts the primary separated portion as the object to be cut;
 machining allowance extracting circuitry to extract the machining allowance at intervals of the sampling pitch; and
 deviation calculating circuitry to calculate a standard deviation of the extracted machining allowance,
 wherein the second generating circuitry causes the extraction of the machining allowance and the calculation of the standard deviation to be performed at each of a plurality of angles through which the primary separated portion is rotated in a cut plane of the primary separated portion, and, based on the calculated standard deviation, sets data for displaying information indicating at least one angle of the plurality of angles on at least one of the plate and the primary separated portion, as the secondary data.

7. The additive manufacturing support device according to claim 1, further comprising a display on which the secondary data is displayed.

8. The additive manufacturing support device according to claim 2, further comprising a display on which the secondary data is displayed.

9. The additive manufacturing support device according to claim 3, further comprising a display on which the secondary data is displayed.

10. The additive manufacturing support device according to claim 4, further comprising a display on which the secondary data is displayed.

11. The additive manufacturing support device according to claim 5, further comprising a display on which the secondary data is displayed.

12. The additive manufacturing support device according to claim 6, further comprising a display on which the secondary data is displayed.

13. The additive manufacturing support device according to claim 1, further comprising a display on which the secondary data is displayed.

14. An additive manufacturing support method for supporting additive manufacturing of a shaped article on a plate, the additive manufacturing support method comprising:
 by an additive manufacturing support device,
 reading shaped article data that is data indicating a three-dimensional shape of the shaped article;
 generating primary data that is data indicating a three-dimensional shape of a primary separated portion provided between the plate and the shaped article and cut by a cutting part of a cutting apparatus; and
 generating, based on a machining allowance that is a length along which an object to be cut and the cutting part and an object to be cut in a process in which the cutting part intersect in a process in which the cutting part passes between the plate and the shaped article, secondary data in which change in the machining allowance is reduced compared to the primary data;
 setting a sampling pitch in a process in which the cutting part cuts the primary separated portion as the object to be cut;
 extracting the machining allowance at intervals of the sampling pitch;
 calculating a standard deviation of the extracted machining allowance;
 extracting of the machining allowance and the calculation of the standard deviation is performed at each of a plurality of rotation angles through which the primary separated portion is rotated in a cut plane of the primary separated portion;
 determining a traveling direction of the cutting part, based on the calculated standard deviation; and
 setting data for displaying information indicating the traveling direction on at least one of the plate and the primary separated portion, as the secondary data.

15. A computer program product comprising a non-transitory computer usable medium having a computer readable additive manufacturing support program for supporting additive manufacturing of a shaped article on a plate, the additive manufacturing support program causing a computer to execute:
 reading shaped article data that is data indicating a three-dimensional shape of the shaped article;
 generating primary data that is data indicating a three-dimensional shape of a primary separated portion provided between the plate and the shaped article and cut by a cutting part of a cutting apparatus;
 generating, based on a machining allowance that is a length along which an object to be cut and the cutting part intersect in a process in which the cutting part passes between the plate and the shaped article, secondary data in the machining allowance is reduced compared to the primary data;

setting a sampling pitch in a process in which the cutting part cuts the primary separated portion as the object to be cut;

extracting the machining allowance at intervals of the sampling pitch;

calculating a standard deviation of the extracted machining allowance;

extracting of the machining allowance and the calculation of the standard deviation is performed at each of a plurality of rotation angles through which the primary separated portion is rotated in a cut plane of the primary separated portion;

determining a traveling direction of the cutting part, based on the calculated standard deviation; and setting data for displaying information indicating the traveling direction on at least one of the plate and the primary separated portion, as the secondary data.

* * * * *